Patented Sept. 21, 1937

2,093,426

UNITED STATES PATENT OFFICE 2,093,426

DIRECT HYDRATION OF OLEFINES

Henry Dreyfus, London, England

No Drawing. Application August 22, 1932, Serial No. 629,897. In Great Britain September 11, 1931

14 Claims. (Cl. 260—156)

This invention relates to the hydration of olefines, and especially to the direct hydration of olefines by means of water vapour.

According to the present invention it has been found that hydration products, and particularly alcohols, may be obtained in a very satisfactory manner by causing olefines to react with water vapour in the presence of aqueous sulphuric, phosphoric, sulphonic or other strong acids.

The concentration of the acid employed may be varied according to the particular acid used and according to the particular olefine treated. For instance, sulphuric acid of about 40 to 80% or more may usually be employed, and when ethylene is being treated, the best results may be obtained by maintaining the concentration of the acid between about 55 and 65%, whilst when propylene is being treated, it is advantageous to maintain the acid at about 45 to 50%. Further, phosphoric acid may usually be employed in a concentration of about 75-90% or more, a relatively high concentration being preferably maintained when ethylene is treated (e. g. 85-90% or more) and lower concentrations with higher homologues of ethylene (e. g. about 60-85% in the case of propylene). Whilst acids of the concentrations above indicated are preferably used, the invention is not limited in this respect and, if desired, more dilute solutions may be employed, in which case it is advantageous to use somewhat higher temperatures, pressures and/or longer times of contact.

The temperatures at which the olefines and water vapour are caused to react may vary considerably, temperatures approaching but lower than the boiling point of the acid solution usually being suitable. In the case of sulphuric acid, temperatures of about 130° to 160° or more may usually be employed with advantage whilst in the case of phosphoric acid temperatures of about 200 to 300° C. are most suitable.

The reaction between the olefine and water vapour may be effected at atmospheric pressure, reduced pressure or super-atmospheric pressure. Preferably pressures of about 50 atmospheres or higher, e. g. pressures of 250 or more atmospheres are employed.

The proportion of steam employed in admixture with the olefine is preferably adjusted so that excessive change in the concentration of the acid does not occur. The proportion of steam necessary to secure this result may be varied according to the conditions of temperature, pressure and the like under which the reaction is effected. Usually a proportion of olefine of about 10 to 20 molecular weights to each molecular weight of water vapour is advantageous.

In carrying out the process of the invention a mixture of ethylene or other olefine and steam may be passed in a stream through the acid contained in any appropriate vessel, or may be passed through a column or the like counter-current to the acid. After leaving the acid, the vapourous product may be suitably treated to recover the alcohol.

The acid employed for the purposes of the invention may advantageously contain metals, salts or other substances capable of promoting the absorption of olefines by sulphuric acid. As instances of such substances may be mentioned silver sulphate, calcium sulphate, lead sulphate, iron sulphate, ferrous ammonium sulphate, silver, copper, mercurous sulphate. The reaction of the invention is beneficially affected by quite small quantities, such for instance as between ½% and 4%, of such substances.

Before passing into contact with the acid the mixture of steam and ethylene or other olefine may itself be first absorbed in the acid of the desired concentration either to a limited extent or even until substantial saturation of the acid is attained. In such absorption the olefine is preferably absorbed in substantial absence of steam at temperatures substantially lower than those employed during the subsequent passage of the steam and olefine. Temperatures below about 80° C. are particularly suitable for the absorption in the case of ethylene, whilst even lower temperatures such as 10° to 20° C. are particularly suitable for the absorption in the case of propylene and higher homologues. The acid during the preliminary absorption and/or during the passage of the mixture of olefine and steam may advantageously contain compounds capable of promoting the absorption of olefines by the acid. The absorption of the olefine and the subsequent passage of the mixture of olefine and steam may be performed under any convenient pressures, e. g. at ordinary atmospheric pressure or under raised pressures and the pressure employed for the absorption may be similar or dissimilar to that employed during the passage of steam and olefine.

The following examples serve to illustrate methods of effecting the hydration of ethylene, but it is to be understood that these examples are given solely by way of illustration and are in no way limitative.

Example 1

A mixture of ethylene and steam in about the molecular proportions 18:1 is passed, at a pressure of 50 atmospheres, through aqueous sulphuric acid, having an initial concentration of about 75% and maintained at a temperature of about 165° C. at a space velocity of about 8000 (calculated at N. T. P.).

The concentration of the acid falls at first, owing to the formation of ethyl sulphuric acid and alcohol but is afterwards maintained at about 60 to 63% strength.

The hydration product (alcohol containing little or no ether) is separated from unchanged ethylene which is returned for recirculation through the acid after admixture with steam.

Example 2

A mixture of ethylene and steam in about the molecular proportions of 14:1 is passed, at a pressure of 50 atmospheres, through ortho-phosphoric acid, of an initial concentration of about 90%, at a space velocity of about 6000 (calculated at N. T. P.). During the process the acid, which is maintained at a temperature of about 240° C., loses a small amount of water, thereby becoming slightly more concentrated.

The gases and vapours leaving the acid are treated as in Example 1.

What I claim and desire to secure by Letters Patent is:—

1. A continuous process for the direct hydration of olefines which comprises feeding an olefine and water vapour mixture in which there is an excess of olefine into contact, under a pressure of at least 50 atmospheres, with an aqueous strong acid which is in the free liquid phase and which is of at least 50% concentration and condensing and recovering the hydration product from the vapourous mixture leaving the acid.

2. A continuous process for the direct hydration of ethylene which comprises feeding a mixture of ethylene and water vapour containing an excess of ethylene into contact, under a pressure of at least 50 atmospheres, with an aqueous strong acid which is in the free liquid phase and which is of at least 50% concentration and condensing and recovering the hydration product from the vapourous mixture leaving the acid.

3. A continuous process for the direct hydration of olefines which comprises feeding an olefine and water vapour mixture in which there is an excess of olefine into contact, under a pressure between 50 and 250 atmospheres, with aqueous sulphuric acid which is in the free liquid phase and which is of at least 50% concentration and condensing and recovering the hydration product from the vapourous mixture leaving the acid.

4. A continuous process for the direct hydration of olefines which comprises feeding an olefine and water vapour mixture in which there is an excess of olefine into contact, under a pressure between 50 and 250 atmospheres, with aqueous sulphuric acid which is in the free liquid phase and maintained at a concentration between about 50 and 80% and condensing and recovering the hydration product from the vaporous mixture leaving the acid.

5. A continuous process for the direct hydration of olefines which comprises feeding an olefine and water vapour into contact, under a pressure between 50 and 250 atmospheres, with aqueous phosphoric acid which is in the free liquid phase and maintained at a concentration of at least 75% and condensing and recovering the hydration product from the vapourous mixture leaving the acid.

6. A continuous process for the direct hydration of olefines which comprises feeding an olefine and water vapour mixture in which there is an excess of olefine into contact, under a pressure between 50 and 250 atmospheres, with an aqueous strong sulphonic acid which is in the free liquid phase and which is of at least 50% concentration and condensing and recovering the hydration product from the vapourous mixture leaving the acid.

7. A continuous process for the direct hydration of ethylene which comprises feeding a mixture of ethylene and water vapour containing an excess of ethylene into contact, at pressures between 50 and 250 atmospheres, with aqueous sulphuric acid which is in the free liquid phase and maintained at a concentration between 55 and 65% and condensing and recovering the hydration produce from the vapourous mixture leaving the acid.

8. A continuous process for the direct hydration of olefines which comprises feeding an olefine and water vapour into contact, under a pressure between 50 and 250 atmospheres, with aqueous sulphuric acid, which is in the free liquid phase and maintained at a concentration between 40 and 80% and a temperature between 130 and 160° C. and condensing and recovering the hydration product from the vapourous mixture leaving the acid.

9. A continuous process for the direct hydration of ethylene which comprises feeding ethylene and water vapour into contact, under a pressure of between 50 and 250 atmospheres, with aqueous sulphuric acid, which is in the free liquid phase and maintained at a concentration between 56 and 65% and a temperature between 130 and 160° C. and condensing and recovering the hydration product from the vapourous mixture leaving the acid.

10. A continuous process for the direct hydration of olefines which comprises feeding an olefine and water vapour into contact, under a pressure of between 50 and 250 atmospheres, with aqueous phosphoric acid, which is in the free liquid phase and maintained at a concentration of at least 75% and a temperature between 200 and 300° C. and condensing and recovering the hydration product from the vapourous mixture leaving the acid.

11. A continuous process for the direct hydration of olefines which comprises feeding an olefine in admixture with one molecular weight of water vapour to each ten to twenty molecules of olefine into contact, under a pressure of at least 50 atmospheres, with an aqueous strong acid which is in the free liquid phase and which is of at least 50% concentration and condensing and recovering the hydration product from the vapourous mixture leaving the acid.

12. A continuous process for the direct hydration of ethylene which comprises feeding ethylene in admixture with one molecular weight of water vapour to each 10 to 20 molecules of ethylene into contact, under a pressure between 50 and 250 atmospheres, with an aqueous strong acid in the free liquid phase which acid contains absorbed ethylene and which is of at least 50% concentration and condensing and recovering the hydration product from the vapourous mixture leaving the acid.

13. A continuous process for the direct hydration of ethylene which comprises feeding ethylene in admixture with one molecular weight of water vapour to each 10–20 molecular weights of ethylene into contact, under a pressure of between 50 and 250 atmospheres, with aqueous sulphuric acid, which is in the free liquid phase and maintained at a concentration between 55 and 65% and at a temperature of between 130 and 160° C., and condensing and recovering the hydration product from the vapourous mixture leaving the acid.

14. A continuous process for the direct hydration of ethylene which comprises feeding ethylene in admixture with one molecular weight of water vapour to each 10–20 molecular weights of ethylene into contact, under a pressure of between 50 and 250 atmospheres, with aqueous phosphoric acid, which is in the free liquid phase and maintained at a concentration of at least 75% and at a temperature of between 200 and 300° C., and condensing and recovering the hydration product from the vapourous mixture leaving the acid.

HENRY DREYFUS.

CERTIFICATE OF CORRECTION.

Patent No. 2,093,426.　　　　　　　　　　　　　　September 21, 1937.

HENRY DREYFUS.

It is hereby certified that error appears in the printed specification of the above numbered patent requiring correction as follows: Page 2, second column, line 40, claim 9, for the numeral "56" read 55; and that the said Letters Patent should be read with this correction therein that the same may conform to the record of the case in the Patent Office.

Signed and sealed this 16th day of November, A. D. 1937.

Henry Van Arsdale,
Acting Commissioner of Patents.

(Seal)